Feb. 16, 1943.  E. S. PERSSON  2,311,413
SCREEN FOR WINDOWS
Filed March 14, 1940  6 Sheets-Sheet 1

Inventor

ERIC SIGFRID PERSSON

By Young, Emery & Thompson
Attorneys

Feb. 16, 1943.  E. S. PERSSON  2,311,413
SCREEN FOR WINDOWS
Filed March 14, 1940  6 Sheets-Sheet 2
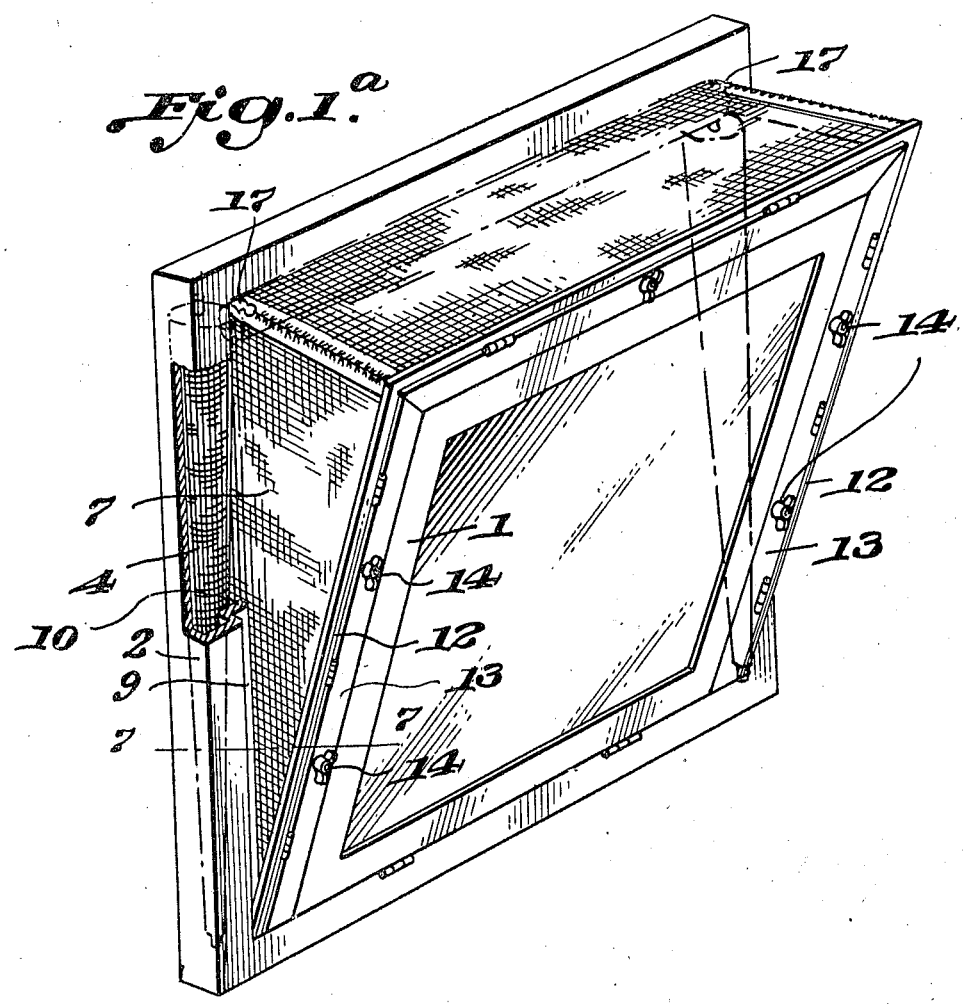
Fig. 1.ª
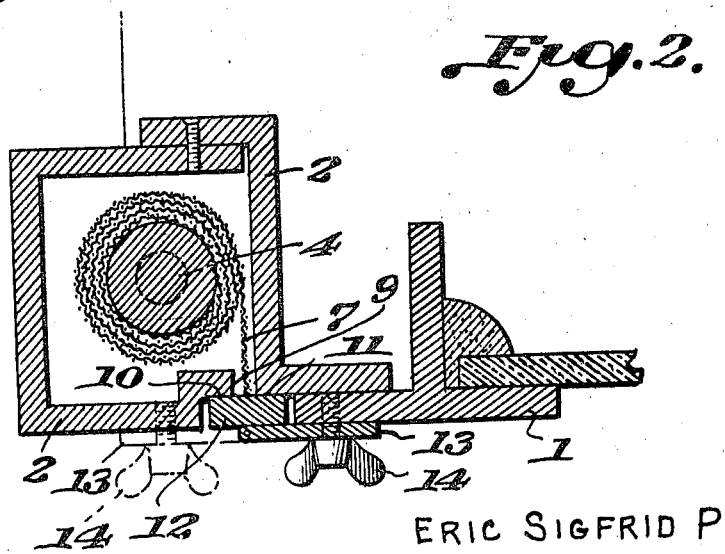
Fig. 2.
Inventor
ERIC SIGFRID PERSSON
By Young, Emery & Thompson
Attorneys Feb. 16, 1943. E. S. PERSSON 2,311,413
SCREEN FOR WINDOWS
Filed March 14, 1940 6 Sheets-Sheet 3
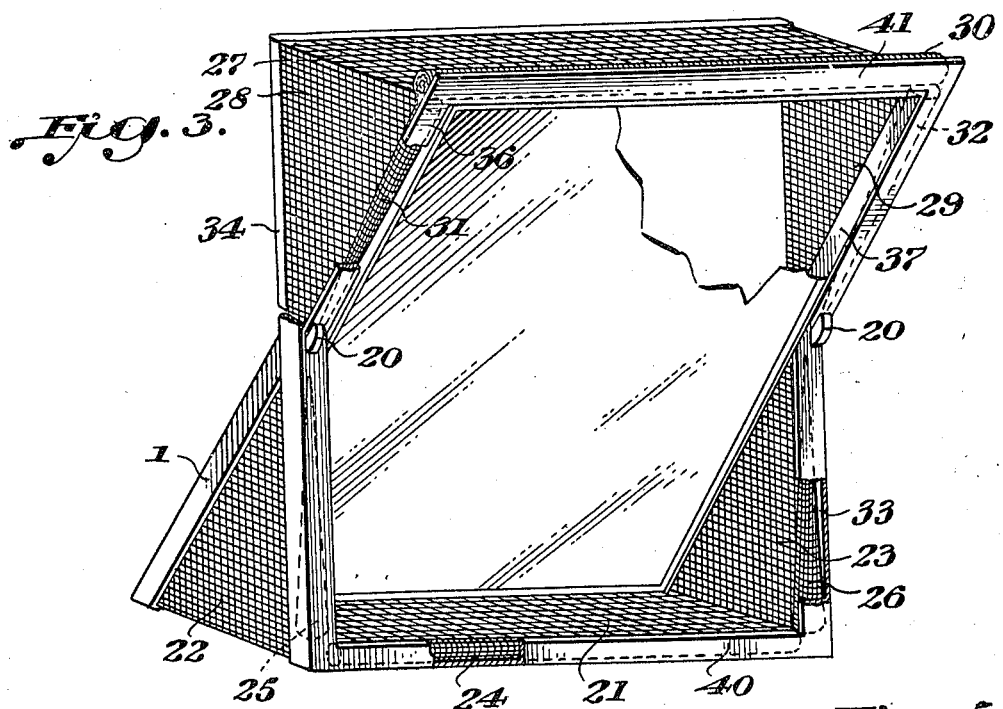
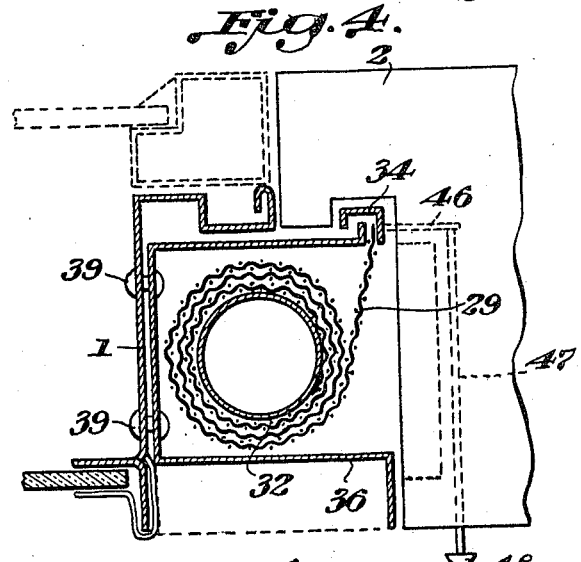
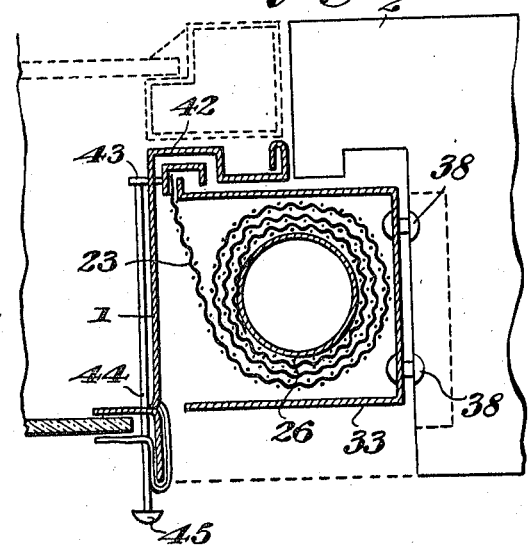
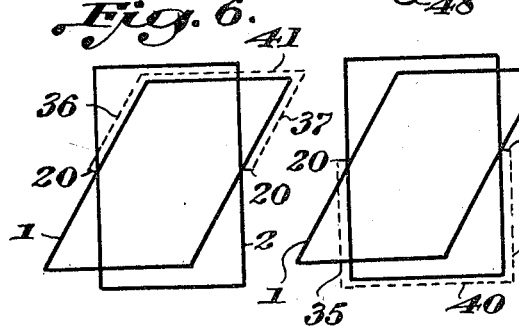
Inventor,
Eric Sigfrid Persson.
By Young Emery & Thompson
Attys.

Inventor,
Eric Sigfrid Persson.

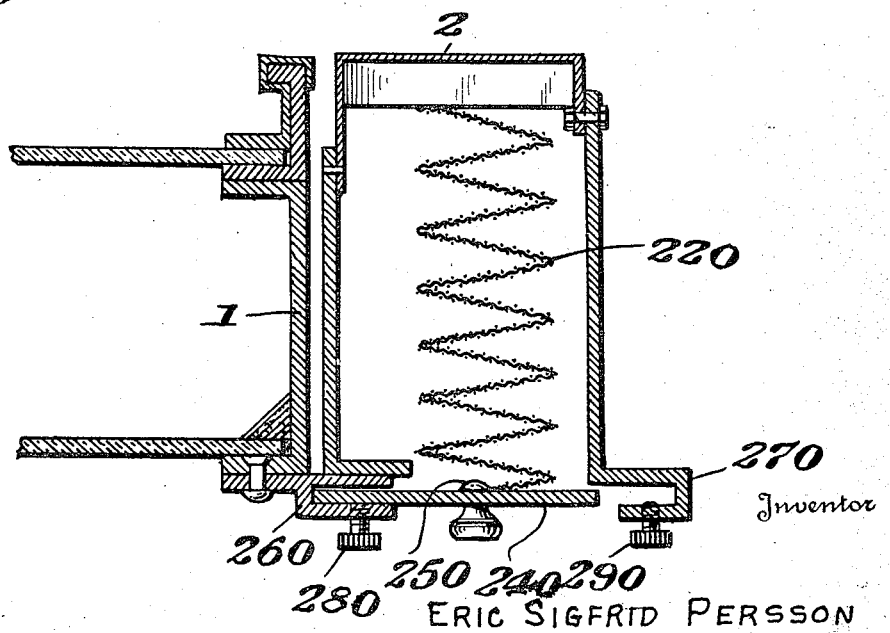

Feb. 16, 1943. E. S. PERSSON 2,311,413
SCREEN FOR WINDOWS
Filed March 14, 1940   6 Sheets-Sheet 6
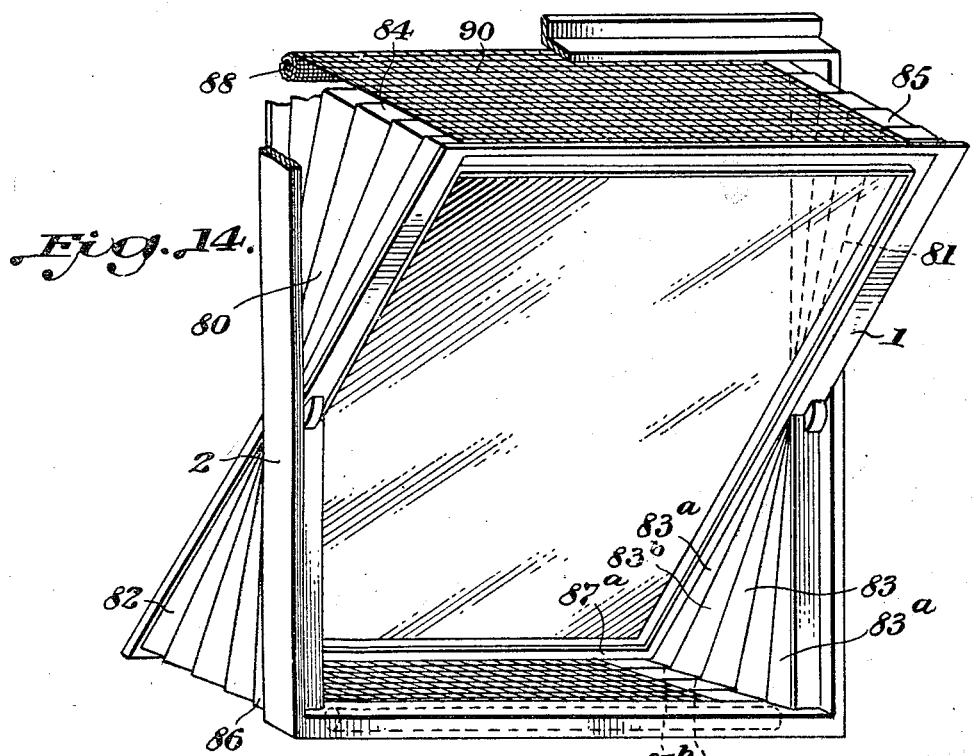
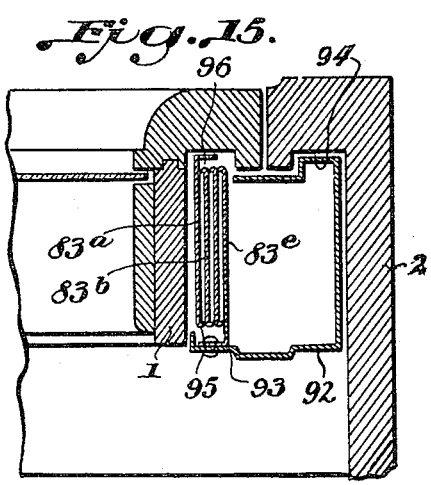
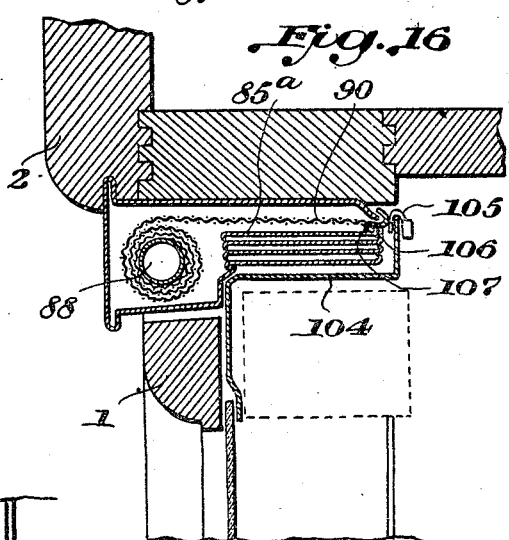
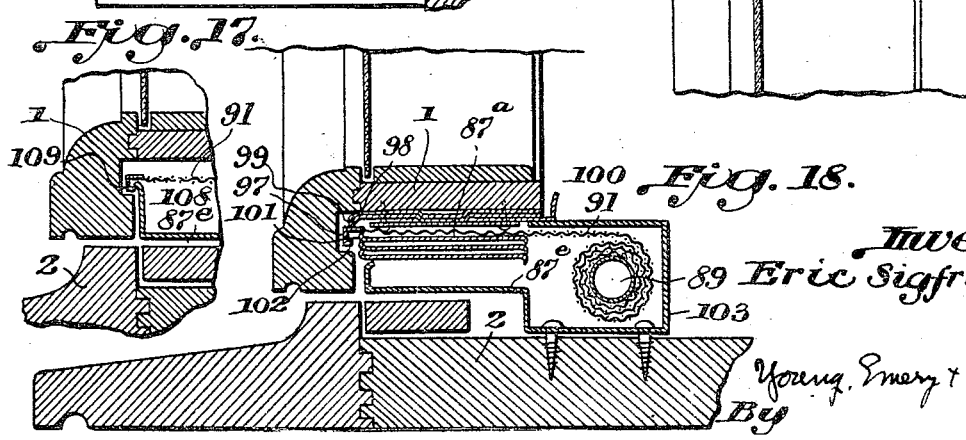

Patented Feb. 16, 1943

2,311,413

UNITED STATES PATENT OFFICE 2,311,413

SCREEN FOR WINDOWS

Eric Sigfrid Persson, Malmo, Sweden

Application March 14, 1940, Serial No. 323,999

20 Claims. (Cl. 160—20)

My present invention relates to a window screen for windows of the types adapted to turn or pivot on an axis either horizontal or vertical.

The main object of my invention is to provide a window screen of the type indicated which leaves the surface of the pane and, consequently, the sight, unobstructed or practically unobstructed.

Another object of my invention is to provide a screen or an air filter, or both, of the kind indicated which covers the window openings, when the window is opened up to a certain extent, and readily enables the window to be further opened, although the screen does not then cover the window opening.

Still another object of my invention is to provide a window screen of the kind indicated which is automatically extended and pulled back at the opening and closing movements of the window sash, respectively.

Figure 1:
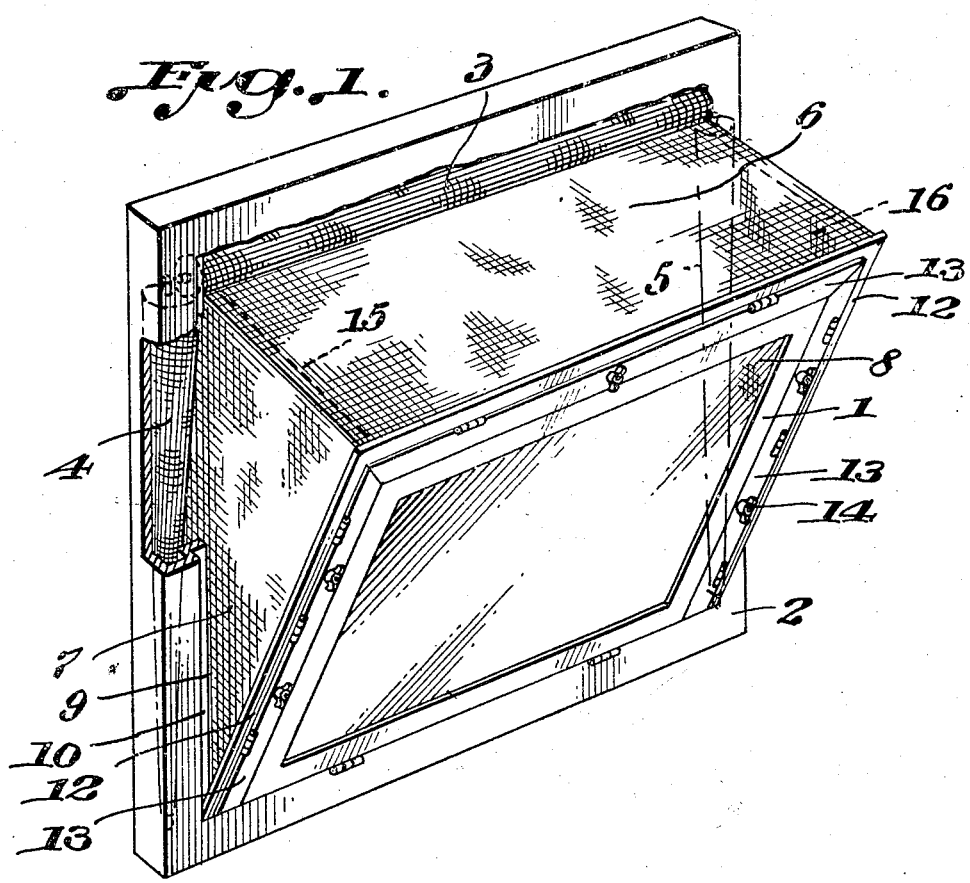

Certain other new and useful features of my invention will be apparent from the following description having reference to the drawings in which:

Figs. 1 and 1a show perspective views of one embodiment of my invention, certain parts being cut away in order to facilitate the explanation, Fig. 2 shows a sectional view, to an enlarged scale, of the left-hand side piece of said window in Fig. 1 with the sash in closed position, Fig. 3 shows a perspective view of another embodiment of my invention, certain parts being cut away also in this case, Figs. 4 and 5 are cross sectional views, to an enlarged scale, of the right-hand side piece of Fig. 3 above and below the axis of rotation of the window, respectively, with the sash in closed position, Figs. 6 and 7 show diagrammatic views illustrating certain features in connection with the embodiment of Fig. 3, Figs. 8 to 11, inclusive, show detail views, also to an enlarged scale, of certain parts of the embodiment of Fig. 3, Fig. 12 shows a perspective view of a further embodiment of my invention, Fig. 13, to an enlarged scale, shows a sectional view of the right-hand side piece of the window of Fig. 12 with the sash in closed position, Fig. 14 shows a perspective view of still another embodiment of my invention, Figs. 15, 16, and 17, 18, to an enlarged scale, show sectional views with the sash in closed position, of the side piece, the top piece, and the bottom piece of the window, respectively.

In the embodiment of my invention illustrated in Figs. 1 and 2 a window sash 1 is hingedly connected to a window frame 2 at the bottom member thereof. A cylindrical screen roller 3 is mounted at the top of the window frame and extends along the top member thereof. At each side member of the window frame another screen roller 4 and 5, respectively, is mounted, said last-mentioned rollers 4 and 5 being of a conical shape, the diameter decreasing from the top towards the bottom end thereof.

The rollers 3, 4, and 5 are each provided with a screen member 6, 7, and 8, respectively, wound thereon, the free edge of each screen member being detachably secured to the corresponding member of the window sash 1. This can be accomplished in several different ways, for instance, as shown in Figs. 1 and 2, where the roller 4 is enclosed within a casing forming the window frame 2. Said casing is provided with a longitudinal slot 9 and includes two abutment surfaces 10 and 11 for receiving a bar 12, to which the edge of the screen 7 is attached. A flap member 13 is hingedly connected to said bar 12, said flap member 13 being adapted to be detachably connected with the sash 1—as shown on the drawings—or with the frame 2—as indicated by dotted lines in Fig. 2—by means of, for instance, screws 14. The roller 4 is provided with a spring (not shown) tending in a known manner to pull the bar 12 into engagement with the abutment surfaces 10 and 11. It will be obvious that, when the flap 13 is connected to sash 1, the bar 12 is forced to partake in the movements of the sash, the screen member 7 thus being extended and pulled in (by means of the said spring) according to the movements of said sash 1. On the other hand, when the bar 12 is connected to the frame 2, the sash can be moved independently of the screen member 7. It may be observed that in Fig. 1 the rollers 3 and 4 are partly shown uncovered in order to facilitate the explanation.

It is not absolutely necessary that rollers 4 and 5 be of a conical shape. The fact is that they could be of a cylindrical as well which should be obvious without any further explanation. Of course, it would also be possible to mount the screen rollers in the corresponding members of the sash 1 instead of in frame 2.

In Figs. 3 to 7, inclusive, another embodiment of my invention is illustrated in connection with a pivoted window having horizontal pivots at 20 at about the middle of the height of the window. In this case the openings between the frame and sash formed below the levels of the pivots, when the window is opened, are covered by screen members 21, 22, 23 corresponding to screen members 6, 7, and 8, respectively, as described above and mounted on rollers 24, 25, 26, respectively, corresponding to rollers 3, 4, and 5 as referred to above.

The openings formed above the pivotal axis of the window are covered in a similar manner by screen members 27, 28, 29 mounted on rollers 30, 31, and 32, respectively. These rollers 30, 31, 32 are mounted in the sash, as shown in Fig. 3.

In this connection it should be noted that the actual frame is not shown in Fig. 3, the members 33 and 34 being connected to the frame in a way that will now be explained in detail with reference particularly to Figs. 4 and 5.

In Figs. 4 and 5, the sash 1 and frame 2 are shown in section together with the arrangement illustrated in Fig. 3. Fig. 4 shows a horizontal section above the axis of rotation of the window, and Fig. 5 shows a similar section below said axis. In both cases the sash is shown in closed position.

Each roller 25, 26, 31, 32 is mounted in a casing or cover, 35, 33, 36, and 37, respectively, the covers 36, 37 being fixedly connected to the sash 1 as shown at 39 in Fig. 4. The cover 36 is placed exactly above the cover 35 so as to form a direct prolongation of said last mentioned cover 35 with the exception that the cover 35 is open towards the sash, while the cover 36 has its open side towards the frame. The arrangement is identical at the other vertical side of the window, i. e. in respect of covers 33 and 37, as should be obvious from the drawing. The rollers 24 and 30 can be mounted in similar covers 40 and 41, respectively, and although it is not absolutely necessary, said covers 40 and 41 can connect the covers 35 and 33, and 36 and 37, respectively, to form two separate cover units 35, 40, 33 and 36, 41, 37, respectively, as indicated diagrammatically in Figs. 7 and 6, respectively, by means of dotted lines. Said two cover units can be connected with each other at 20 by means of hinges of any suitable kind as, for instance, the hinges shown in my Patent No. 2,221,058 of November 12, 1940 (pat. applic. No. 265,300, filed March 31, 1939), said hinges thus forming the pivot means of the window sash. Of course, said cover units can be made readily removable, if desired.

The free edge of the screen 23 is connected to a member 42 mounted longitudinally of the cover 33, and said member 42 can be coupled to the sash 1 by means of a latch means 43 provided with an operating rod 44 extending through the sash material to the inner side of the sash 1 and manually turnable by means of a knob 45.

When this latch means 43 is released, the member 42 is kept in engagement with the cover 33 thanks to the spring action exerted on the roller 26, and in said case the screen 23 is, of course, entirely unconnected with the sash 1. When the latch means 43 engages the member 42 the edge of the screen 23 is connected with the sash 1 so that, when the sash is being opened, the screen is unrolled against the action of the roller spring and carried to its covering, or operative position, as shown in Fig. 3.

In a similar way, the screen 29 is connected to the member 34 which by means of a latching means 46, an operating rod 47 mounted in the frame 2, and a handling knob 48 is releasable from said frame 2 when it is desired to put the screen out of function as, for instance, for the purpose of turning the window around.

The joints at 15 and 16 in Fig. 1 between screen member 6 on one hand, and screen members 7 and 8 on the other hand or between the different screen members in Fig. 3 could be tightened in several different ways. Thus, for instance, the screen member 6 can be made to extend beyond screen members 7 and 8, as indicated in Fig. 1. In this case the upper edges of screen members 7 and 8 engage the lower surface of screen member 6. If desired, the tightness of the joints could be improved by attaching rubber strips to the upper edges of screen members 7 and 8.

Another example of a tightening system at this joint comprises a zip fastener 17 having its slide member fixedly connected to the frame 2. The operation of said device should be apparent without explanations in detail, in view of the showing in Fig. 1a.

Figure 10:
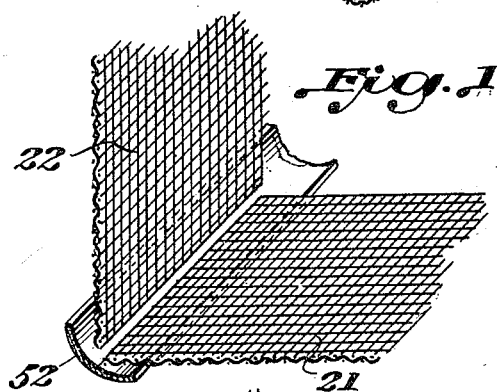
Figure 9:
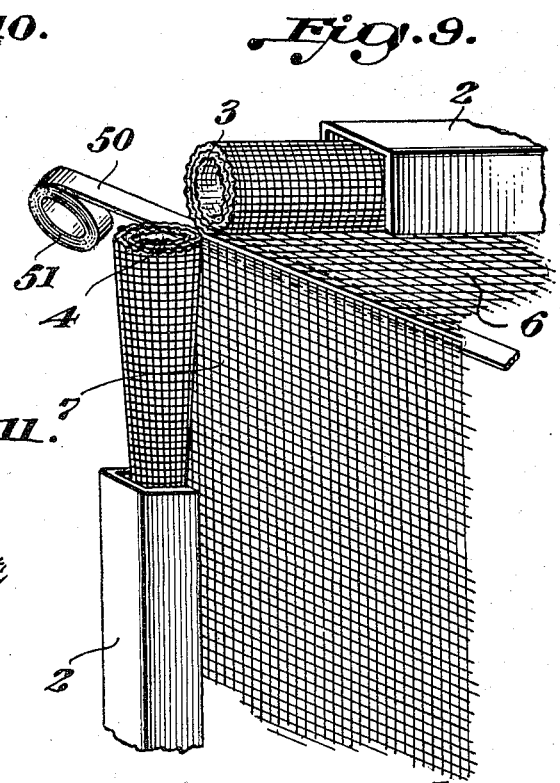
Figure 11:
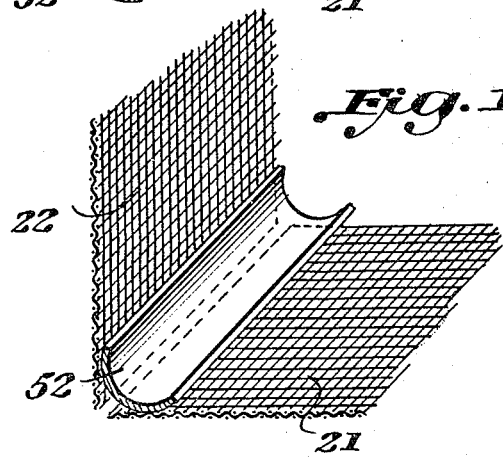

In Figs. 9, 10, and 11 still another device for closing said joints is illustrated. It comprises a metal strip 50 which is curved in section and rolled onto a suitable drum 51 rotatably mounted in the frame 2 at the corner thereof. The end of said strip 50 is preferably detachably fastened to the sash in such a manner that, when the sash is opened, the strip is unrolled from the drum and occupies the position shown in Fig. 9 thus closing the joint between screen members 6 and 7. Naturally, the drum 51 can be provided with a spring of a similar kind and for a similar purpose as those utilized in the different screen rollers as described above.

Figure 8:
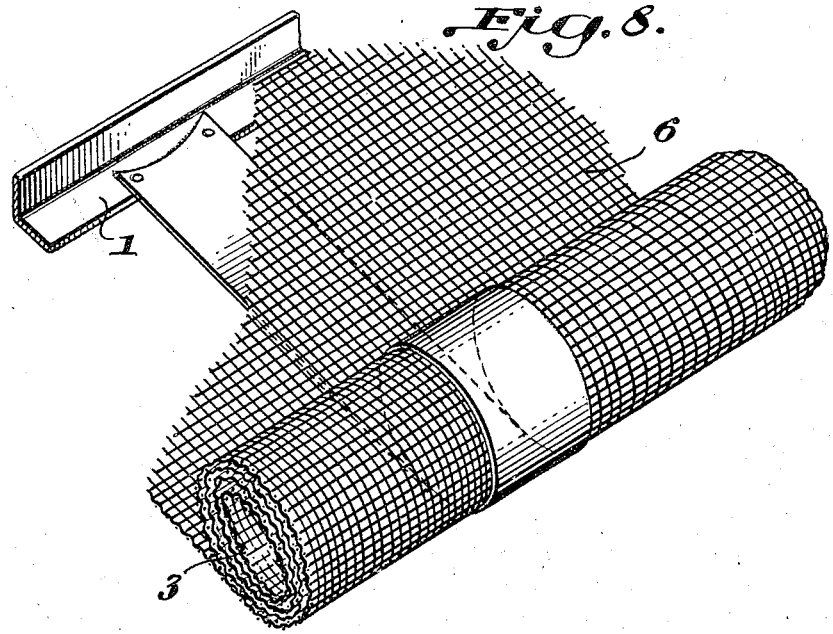

In Figs. 10 and 11 two different embodiments of the corresponding arrangement at a bottom joint are shown as, for instance, between screen members 21 and 22 in Fig. 3. In the case of Fig. 10, the strip 52 is positioned on the outside of the joint while, according to Fig. 11, it is placed on the inside of said joint, as illustrated. In some cases it might be convenient to have the strip fastened to one of the screen members and adapted to roll with said screen member on the roller thereof. In Fig. 8 a similar strip 53 is utilized as a support for a screen member, such as the member 6 in Fig. 1, mounted on a horizontal roller, as the roller 3 in Fig. 1.

The embodiment of my invention illustrated in Figs. 12 and 13 comprises two bellows like screen members 210 and 220 to cover the triangular openings between the sash 1 and frame 2. The rectangular top opening is covered by a rolling screen member 6 of the same type as in Fig. 1 and said screen member 6 can be detachably connected to the sash 1 by any suitable means.

The bellows like screen members are attached to the sash and frame as illustrated particularly in connection with screen member 220, it being understood that the other screen members 200 and 210 can be mounted in a similar way. In this case, screen member 220 is mounted in the frame 2 which is shaped as a cover. The free edge of the screen member 220 is connected to a plate 240 as shown at 250, said plate 240 being adapted to be moved to the left or to the right in Fig. 13, according to whether it is to be connected to the sash 1 or to the frame 2, respectively.

The sash 1 is provided with a U-shaped guiding means 260 at its inner side and the frame 2 has a similar guiding means 270, the open sides of said guiding means 260 and 270 facing each other, as shown in Fig. 8. Each guiding means 260 and 270, respectively, is provided with one or more crews 280 and 290, respectively, in order to enable the plate 240 to be secured to either of them, according to whether it is to be connected with the sash 1 or the frame 2, respectively.

Another embodiment is shown in Figs. 14 to 18, inclusive, in connection with a window adapted to turn on pivots at about the middle of the height of the window.

In said embodiment, the triangular openings formed between the frame 2 and sash 1 are covered by superimposed slats 80, 81, 82, 83. Said slats are, however, provided with horizontal extensions 84, 85, 86, and 87, respectively, directed inwards and to some extent covering the rectangular openings between the frame and sash.

In the top and bottom pieces of the frame spring rollers 88 and 89, respectively, are mounted having screen members 90 and 91, respectively, covering said rectangular openings between the frame and sash. Said screen members 90, 91 are supported by the extensions 84, 85, and 86, 87, respectively, and in this way the openings between the frame and sash are entirely covered.

Fig. 15 shows a horizontal sectional view of the window side member on a line below the pivot axis of said window as shown in Fig. 14, and the window is opened by moving the sash 1 upwards in Fig. 15. The slat 83e adjacent the frame 2 is fastened to a casing 92 at 93, and said casing is in turn connected with the frame 2 as at 94. The slat 83a adjacent the sash 1 is releasably connected with the sash 1, the connecting means being described below with reference to Figs. 17 and 18, in which the extensions 85 and 87 are shown.

The edge portion 95 of the slat 83a is bent over outwards, and the other edge portion 96 of slat 83b is bent over inwards, as shown, so that when the slat 83a is moved upwards in Fig. 15 at the opening movement of the sash 1, the parts 95 and 96 engage each other and keep the slats 83a, 83b together. As should be obvious from the drawing, the other slats are provided with similar engaging edge portions for the purpose set forth.

The horizontal bottom extensions 87 of said slats are shown in Fig. 18. The uppermost extension 87a of the slat 83a is provided with a hole 97 coacting with an elastic member 98 mounted in guides 99 on the bottom surface of the sash 1, said elastic member 98 being provided with an operating portion 100 projecting at the inside of the sash 1.

Said upper slat 87a is provided with other bent over portions 101 for cooperation with hooks 102 at the edge of the screen member 91 on the roller 89. The lower extensions 87 are equipped with bent over portions as in the case of slats 83, and the bottom extension 87e is fixedly connected with the frame 2 by the intermediary of a casing 103 containing the roller 89.

At the top of the window frame (Fig. 16), the top extension 85a corresponds to slat 83a and is releasably connected to the sash 1 by the intermediary of a casing 104 and a connecting hook 105 which is turnably attached to an edge member 106 of the screen member 90. Said edge member 106 is provided with a hook shaped portion 107 for engagement with a corresponding portion of slat 85a, as indicated in Fig. 16.

The connecting hook 105 can be turned to one side or the other so as to be unhooked from the edge of the casing 104, whereby the connection between the sash 1 and the screen members 85, 90 is released.

In Fig. 17 the connection between the edge of screen member 91 and the fixed slat 87e is shown, said sectional view being taken at a place beyond the ends of the extensions 87. The edge portion of said slat 87e is bent, as shown at 108, and a hook shaped edge part 109 of the screen member 91 is adapted to coact therewith.

Thus it should be evident that the entire structure is of a kind enabling the window to be opened to a certain extent with screens automatically covering all openings between frame and sash, at the same time leaving the view substantially unobstructed, as illustrated in Fig. 14. On the other hand, when the screen is not required, it can readily and by very simple means be released from the sash and remain in its inactive position in the frame, when the window is being opened.

The slats 80 and 82 can, of course, be made continuous from the top to the bottom of the window, and the same applies to the slats 81 and 83.

It is to be noted that in all the embodiments shown, in which rollers are used, said rollers are mounted in such a manner as to make the line of unrolling of the screen from the roller rise or sink according to the particular conditions at the place of the roller and the manner of coaction with other members.

Thus, for instance, in Figs. 16 and 18 the screen unrolls from the top of the rollers 88 and 89, respectively, causing the contact line between the unrolled and remaining screen portions to sink during unrolling.

It is to be understood that any suitable material could be used for the screen according to the purpose and the construction thereof. Thus, for instance, the material may be netting, perforated metal sheet, perforated paper or cellulosic material, etc. The screens may also form air filters, if desired. The screen may further be applied to all kinds of windows which are turnable on pivots or hinges about an axis, either horizontal or vertical. It is further to be noted that, in many cases, the screen according to my invention forms an effective sun shade which may be used in connection with blinds of any kind, preferably applied on the sash.

In all the embodiments described the screen is supposed to be attached to the inner side of the window but there is, of course, nothing to prevent it from being mounted on the outside, should it for any reason be desired.

Since certain other changes may be made in the above article and several different embodiments of the invention could be made without departing from the scope thereof, it is intended that all matter contained in the above description or shown in the accompanying drawings shall be interpreted as illustrative and not in a limiting sense.

In this connection it should be particularly noted that parts of the screening means themselves or a casing wholly or partly enclosing the compressed screen can simultaneously be utilized as abutment and tightening surfaces between the frame and sash. Such a feature is shown, for instance, in Figs. 2, 13, 15, and 16. Of course, said casing can contain also other members, such as blinds, wind-shields, operating means for the window, etc. In these embodiments the abutment surface is suitably placed in the horizontal symmetric line through the centre of gravity of the window sash or a small distance at the outside thereof.

It is also to be understood that the following claims are intended to cover all of the generic and specific features of the invention herein described; and all statements of the scope of the invention which, as a matter of language, might be said to fall therebetween.

Having described my invention, what I claim as new and desire to secure by Letters Patent is:

1. In windows of the type having a sash mounted to pivot in a frame so as to form, in opened position, at least two triangular openings and at least one rectangular opening between the frame and sash, a window screen comprising two screen members adapted to cover the triangular openings between the frame and sash, a third screen member adapted to cover the rectangular opening between the frame and sash, one edge of each screen member being detachably fastened to the sash, a spring actuated roller mounted in the frame to receive said rectangular screen member, and said screen members covering the triangular openings between frame and sash being adapted to be automatically brought to covering position and automatically pulled back by the opening and closing movements of the window sash, respectively.

2. In windows of the type having a sash mounted to pivot in a frame so as to form, in opened position, at least two triangular openings and at least one rectangular opening between the frame and sash, a window screen comprising two screen members adapted to cover the triangular openings between the frame and sash, a third screen member adapted to cover the rectangular opening between the frame and sash, one edge of each screen member being detachably fastened to the sash, a spring actuated roller mounted in the frame to receive said rectangular screen member, two spring actuated rollers mounted in the frame to receive said screen members covering the triangular openings, so as to allow said three screen members to be automatically brought to covering position and automatically pulled back by the opening and closing movements of the window sash, respectively.

3. In windows of the type having a sash mounted to pivot in a frame so as to form, in opened position, at least two triangular openings and at least one rectangular opening between the frame and sash, a window screen comprising at least two screen members adapted to cover the triangular openings between the frame and sash, a third screen member adapted to cover the rectangular opening between the frame and sash, one edge of each screen member being detachably fastened to the sash, a spring actuated roller mounted in the frame to receive said rectangular screen member, two spring actuated conical rollers mounted in the frame to receive said screen members covering the triangular openings, so as to enable said three screen members to be automatically brought to covering position and automatically pulled back by the opening and closing movements of the window sash, respectively.

4. In windows of the type having a sash mounted to pivot in a frame so as to form, in opened position, at least two triangular openings and at least one rectangular opening between the frame and sash, a window screen comprising two screen members adapted to cover the triangular openings between the frame and sash, a third screen member adapted to cover the rectangular opening between the frame and sash, one edge of each screen member being detachably fastened to the sash, a spring actuated roller mounted in the frame to receive said rectangular screen member, and said two triangular screen members each comprising a bellows-like folding means, so as to enable said three screen members to be automatically brought to covering position and automatically pulled back by the opening and closing movements of the window sash, respectively.

5. In windows of the type having a sash mounted to pivot in a frame so as to form, in opened position, at least two triangular openings and at least one rectangular opening between the frame and sash, a window screen comprising two screen members adapted to cover the triangular opening between the frame and sash, a third screen member adapted to cover the rectangular opening between the frame and sash, one edge of each screen member being detachably fastened to the sash, a spring actuated roller mounted in the frame to receive said rectangular screen member, and superimposed plates forming a fan-like means provided at the triangular openings; so as to enable said three screen members to be automatically brought to covering position and automatically pulled back by the opening and closing movements of the window sash, respectively.

6. In windows of the type having a sash mounted to pivot in a frame so as to form in open position at least two triangular openings and at least one rectangular opening between the frame and sash, a window screen comprising two screen members adapted to cover the triangular openings between the frame and sash, a third screen member adapted to cover the rectangular opening between the frame and sash, and a continuous cover enclosing said three screen members when in compressed position.

7. In windows of the type having a sash mounted to pivot in a frame so as to form in opened position two triangular openings and one rectangular opening between the frame and sash at each side of the pivot axis, a window screen comprising four screen members adapted to cover the triangular openings between frame and sash and two screen members adapted to cover the rectangular openings between frame and sash, a continuous cover enclosing said three screen members at each side of the pivot axis, when in compressed position, one cover being attached to the frame, while the other cover is attached to the sash, and hinges connecting the ends of said two covers with each other at the pivot axis of the window.

8. In windows of the type having a sash mounted to pivot in a frame so as to form in opened position at least two triangular openings and at least one rectangular opening between the frame and sash, a roller screen covering the rectangular opening and having its free edge detachably attached to the sash, a number of superimposed slats turnably mounted at each of the triangular openings to cover said opening when in an extended position, extensions of said slats projecting substantially perpendicularly inwards and also being superimposed so as to form, in a spread out position, a support for the roller screen.

9. In windows of the type having a sash mounted to pivot in a frame so as to form in opened position at least two triangular openings and at least one rectangular opening between the frame and sash, a roller screen mounted in the frame and having its free edge detachably attached to the sash, a number of superimposed slats turnably mounted at each of the triangular openings to cover said openings when in an extended condition, extensions of said slats projecting substantially perpendicularly inwards and also being superimposed, and flanges on said extensions to form a support for the roller screen.

10. In windows of the type having a sash mounted to pivot in a frame so as to form in opened position at least two triangular openings and at least one rectangular opening between the frame and sash, a roller screen covering the rectangular opening and having its free edge detachably attached to the sash, a number of superimposed slats turnably mounted at each of said triangular openings to cover said openings when in an extended condition, substantially hook-shaped members at the longitudinal edges of said slats for coupling the slats together, and extensions on said slats projecting substantially perpendicularly inwards and also being superimposed to form a support for the roller screen.

11. In windows of the type having a sash mounted to pivot in a frame so as to form in opened position two triangular openings and one rectangular opening between the frame and sash at each side of the pivot axis of the window, a roller screen covering the rectangular opening and having its free edge detachably attached to the sash, a number of superimposed slats turnably mounted at each of said triangular openings to cover said openings when in an extended condition, substantially hook-shaped members at the longitudinal edges of said slats for coupling the slats together, and extensions on said slats projecting substantially perpendicularly inwards and also being superimposed to form a support for the roller screen.

12. In windows of the type having a sash mounted to pivot in a frame so as to form in opened position two triangular openings and one rectangular opening between the frame and sash, a roller screen covering the rectangular opening and having its free edge detachably attached to the sash, a number of superimposed slats turnably mounted at each side of the window, each series of said superimposed slats covering the two triangular openings at one side of the window, and extensions on said slats projecting substantially perpendicularly inwards and also being superimposed.

13. In windows of the type having a sash mounted to pivot in a frame so as to form in opened position at least two triangular openings and at least one rectangular opening between the frame and sash, a roller screen covering the rectangular opening and having its free edge detachably attached to the sash, a number of superimposed slats turnably mounted at said triangular openings to cover the same when in an extended condition, extensions on said slats projecting substantially perpendicularly inwards to form supports for the roller screen, and said screen roller being mounted so as to give the roller screen a tendency to form a closer contact with said extensions during the operation of unrolling.

14. In windows of the type having a sash mounted to pivot in a frame so as to form in opened position at least two triangular openings and at least one rectangular opening between the frame and sash, a roller screen covering the rectangular opening and unrollable from the top of said roller, the free edge of said screen being detachably attached to the sash, a number of superimposed slats turnably mounted to cover said triangular openings, and extensions on said slats projecting substantially perpendicularly inwards to support said roller screen.

15. In windows of the type having a sash mounted to pivot in a frame so as to form in opened position at least two triangular openings and at least one rectangular opening between the frame and sash, a roller screen covering the rectangular opening and unrollable from the top of said roller, the free edge of the screen being detachably attached to the sash, a number of superimposed slats turnably mounted to cover said triangular openings, extensions on said slats projecting substantially perpendicularly inwards, and flanges on said extensions to form supports for said roller screen.

16. In windows of the type having a sash mounted to pivot in a frame so as to form in opened position at least two triangular openings and at least one rectangular opening between the frame and sash, screen members covering said openings, a continuous bar mounted along the free edges of said screen members, and means for detachably connecting said continuous bar with the opposite window member, so that the entire screen is brought in and out of function by attaching and detaching said bar, respectively.

17. In windows of the type having a sash mounted to pivot in a frame so as to form in opened position at least two triangular openings and at least one rectangular opening between the frame and sash, a roller screen covering said rectangular opening and having its free edge detachably attached to the sash, a number of superimposed slats turnably mounted to cover said triangular openings, extensions on said slats projecting substantially perpendicular inwards to support said roller screen, and means for detachably connecting the extension of the leading slat to the roller screen.

18. In windows of the type having a sash mounted to pivot in a frame so as to form in opened position at least two triangular openings and at least one rectangular opening between the frame and sash, an extendable screen member automatically covering each of said openings when the window is being opened, a casing enclosing each screen member, abutment surfaces on said casing forming abutment surfaces for the frame and sash.

19. In windows of the type having a sash mounted to pivot in a frame so as to form in opened position at least two triangular openings and at least one rectangular opening between the frame and sash, an extendable screen member automatically covering each of said openings when the window is being opened, a casing enclosing each screen member, abutment surfaces on said casing forming abutments between the frame and sash, and said abutment surfaces beginning at a position in the symmetric line through the centre of gravity of the window sash.

20. In windows of the type having a sash mounted to pivot in a frame so as to form in open position at least two triangular openings and at least one rectangular opening between the frame and sash, an extendable screen member automatically covering each of said openings when the window is being opened, a casing enclosing each screen member, abutment surfaces on said casing forming abutments between the frame and sash, and said abutment surfaces beginning at a position a small distance to the outside of the symmetric line through the centre of gravity of the window sash.

ERIC SIGFRID PERSSON.